(12) United States Patent
Chen

(10) Patent No.: US 11,595,999 B2
(45) Date of Patent: Feb. 28, 2023

(54) METHOD AND APPARATUS FOR MAINTENANCE OF BANDWIDTH PART

(71) Applicant: CHINA ACADEMY OF TELECOMMUNICATIONS TECHNOLOGY, Beijing (CN)

(72) Inventor: Li Chen, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 127 days.

(21) Appl. No.: 16/960,749

(22) PCT Filed: Jan. 3, 2019

(86) PCT No.: PCT/CN2019/070250
§ 371 (c)(1),
(2) Date: Jul. 8, 2020

(87) PCT Pub. No.: WO2019/134664
PCT Pub. Date: Jul. 11, 2019

(65) Prior Publication Data
US 2020/0344817 A1    Oct. 29, 2020

(30) Foreign Application Priority Data
Jan. 8, 2018    (CN) .......................... 201810014741.3

(51) Int. Cl.
*H04W 74/08*    (2009.01)
*H04W 24/04*    (2009.01)
(Continued)

(52) U.S. Cl.
CPC ....... *H04W 74/0833* (2013.01); *H04W 24/04* (2013.01); *H04W 52/0225* (2013.01); *H04W 72/042* (2013.01); *H04W 74/006* (2013.01)

(58) Field of Classification Search
None
See application file for complete search history.

(56) References Cited

U.S. PATENT DOCUMENTS 9,755,813 B2    9/2017  Lee et al.
9,775,183 B2 *  9/2017  Miklos ................ H04W 72/042
(Continued)

FOREIGN PATENT DOCUMENTS

| CN | 107493605 A   | 12/2017 |
| EP | 3500038 A1    | 6/2019  |
| WO | 2019125061 A1 | 6/2019  |

OTHER PUBLICATIONS

International Search Report and Written Opinion issued by the International Searching Authority (ISA/CN in PCT Application No. PCT/CN2019/070250 dated Mar. 27, 2019. 10 pages, including English translation of International Search Report.

(Continued)

*Primary Examiner* — Gregory B Sefcheck
(74) *Attorney, Agent, or Firm* — Meunier Carlin & Curfman LLC

(57) ABSTRACT

A method and an apparatus for maintenance of a bandwidth part. The method and apparatus resolve an issue of the prior art in which expiration of a bandwidth part deactivation timer during a random access process changes the bandwidth part to a default bandwidth part, such that data cannot be transmitted on an optimal bandwidth part, and may even cause an interruption of an ongoing data transmission, while also affecting an ongoing random access process. In embodiments of the present invention, a terminal keeps a current active bandwidth part unchanged during a random access process, and performs a restart operation of a bandwidth part deactivation timer after the random access process is successfully completed, such that a situation where a bandwidth part changes to a default bandwidth part does not occur during the random access process, thereby reducing interruption to ongoing data transmissions and reducing the impact on ongoing random access processes.

7 Claims, 5 Drawing Sheets

(51) Int. Cl.
*H04W 52/02* (2009.01)
*H04W 72/04* (2009.01)
*H04W 74/00* (2009.01)

(56) References Cited

U.S. PATENT DOCUMENTS

| | | | |
|---|---|---|---|
| 10,791,562 B2* | 9/2020 | Ryoo | H04W 72/0453 |
| 10,986,655 B2* | 4/2021 | Ryoo | H04W 72/1268 |
| 2014/0050170 A1* | 2/2014 | Xu | H04W 76/27 |
| | | | 370/329 |
| 2015/0003311 A1* | 1/2015 | Feuersaenger | H04L 5/001 |
| | | | 370/311 |
| 2017/0201306 A1* | 7/2017 | Shimezawa | H04W 72/0446 |
| 2018/0020408 A1* | 1/2018 | Zhang | H04L 5/001 |
| 2018/0288746 A1* | 10/2018 | Zhang | H04L 1/0031 |
| 2020/0059345 A1* | 2/2020 | Pelletier | H04L 1/1657 |
| 2020/0374844 A1* | 11/2020 | Takeda | H04W 72/042 |
| 2020/0403763 A1* | 12/2020 | Takeda | H04L 5/001 |

OTHER PUBLICATIONS

Catt. "BWP Inactivity Timer for Active UL BWP." 3GPP TSG-RAN WG2 Meeting #100, R2-1712861, Dec. 1, 2017. 3 pages.
Vivo. "Duplication Deactivation Due to Scell or BWP Deactivaction." 3GPP TSG-RAN WG2 Meeting #99, R2-1708489, Aug. 25, 2017. 4 pages.
Samsung. "Response LS on BWP Operation in NR." 3GPP TSG-RAN WG2 Meeting #99, R2-1709793, Aug. 25, 2017. 2 pages.
Asustek. "Details of BWP Inactivity Timer." 3GPP TSG-RAN WG2 Meeting #100, R2-1712212, Dec. 1, 2017. 5 pages.
Vivo. "BWP Impacton Idle/Inactive Mode." 3GPP TSG-RAN WG2 Meeting #100, R2-1712759, Dec. 1, 2017. 2 pages.
3GPP TS 38.321 V2.0.0, Technical Specification, 3rd Generation Partnership Project; Technical Specification Group Radio Access Network; NR; Medium Access Control (MAC) protocol specification (Release 15) (Dec. 2017).
3GPP TS 38.300, "3rd Generation Partnership Project; Technical Specification Group Radio Access Network; NR; NR and NG-RAN Overall Description" Stage 2 (Release 15) V15.0.0 (Dec. 2017).
3GPP TS 38.321, "3rd Generation Partnership Project; Technical Specification Group Radio Access Network; NR; Medium Access Control (MAC) protocol specification" (Release 15) V15.0.0 (Dec. 1, 2017).
Ericsson, "BWP and random access" 3GPP TSG-RAN WG1 91, Reno, USA (Nov. 27, 2017) R1-1721425.
Mediatek Inc., "Summary of Bandwidth Part Operation", 3GPP TSG RAN WG1 Meeting 91, Reno USA (Nov. 1, 2017) R1-1721504.
Samsung (Rapporteur), "General corrections on TS 38.321" 3GPP TSG-RAN VVG2 Meeting 101, Athens, Greece (Feb. 26, 2018) R2-1803854.
Hisilicon Huawei "Remaining issues for BWP inactivity timer" 3GPP TSG-RAN2 Meeting 101 bis, Sanya, China (Apr. 16, 2018) R2-1804412.
LG Electronics Inc. "Summary of E-mail discussion on [99bs#43][NR UP/MAC] Impact of BWP", R2-1713879, 3GPP TSG-RAN WG2 Meeting #100, Reno USA, Nov. 27-Dec. 1, 2017. 35 pages.
LG Electronics Inc. "TP for BWP", R2-1714046 3GPP TSG-RAN WG2 Meeting #100, Reno, USA, Nov. 27-Dec. 1, 2017, 5 pages.
Samsung Electronics "Correction for BWP-Inactivity Timer Operation", R2-1800096, 3GPP TSG-RAN WG2 AH-1801, Vancouver, Canada, Jan. 22-Jan. 26, 2018, 4 pages.
Catt, "BWP inactivity Timer for active UL BWP", R2-1800174 revision of R2-1712861, 3GPP TSG-RAN WG2 NR AH-1801, Vancouver, Canada, Jan. 22-Jan. 26, 2018, 2018, 6 pages.
Catt, "Further consideration on BWP inactivity timer", R2-1802141, 3GPP TSG-RAN WG2#101, Athens, Greece, Feb. 26-Mar. 2, 2018. 6 pages.

* cited by examiner

METHOD AND APPARATUS FOR MAINTENANCE OF BANDWIDTH PART

CROSS REFERENCE TO RELATED APPLICATIONS

The present application is a US National Stage of International Application No. PCT/CN2019/070250, filed Jan. 3, 2019, which claims priority to Chinese Patent Application No. 201810014741.3, filed with the Chinese Patent Office on Jan. 8, 2018 and entitled "Method and Apparatus for Maintenance of Bandwidth Part", which is hereby incorporated by reference in its entirety.

FIELD

The invention relates to the field of wireless communication technologies and particularly to a method and apparatus for band width part maintenance.

BACKGROUND

In the traditional LTE (Long Term Evolution) system, from the perspective of the network side, the cell bandwidth is less than or equal to the reception bandwidth 20 MHz of user equipment, so the network side always configures the total uplink and downlink bandwidth of the cell for the user equipment, and the user equipment may work in the entire cell bandwidth. In the NR (New Radio) system, the network-side bandwidth may be as high as 400 MHz, which is much greater than the receiving capability of the user equipment. Therefore, the concept of BWP (Band Width Part) is introduced, that is, the large bandwidth of the network side is divided into a plurality of BWPs, one or more BWPs are configured for the user equipment, and a part of the configured BWPs are activated to perform the uplink and downlink transmission for the user equipment, where the activated downlink BWP is called active DL BWP, and the activated uplink BWP is called active UL BWP. In the R15 version, for the user equipment, only one DL BWP and one UL BWP can be activated at one time, and the inactive BWPs cannot be used for the uplink and downlink signaling and data transmission.

After the network side configures a plurality of BWPs for the user equipment, the network side can change the active BWPs through the physical layer signaling DCI (Downlink Control Information), where the uplink and downlink active BWPs may be changed respectively. In addition, the BWP-InactivityTimer (BWP Inactivity Timer) is further introduced. After the BWP inactivity timer expires, the downlink active BWP of the user equipment needs to be changed to the default downlink BWP.

The random access includes contention based random access and contention free random access. The processes thereof are as follows.

The contention based random access procedure is mainly divided into four steps.

Msg1: a UE (User Equipment) selects a random access preamble and the random access resource PRACH (Physical Random Access Channel), and sends the selected random access preamble to the base station on the selected PRACH resource.

Msg2: the base station receives the random access request Msg1 and sends a random access response to the UE.

Msg3: the UE sends the uplink transmission on the UL grant (uplink scheduling information) specified by the Msg2. For different reasons of different random accesses, the content of the Msg3 uplink transmission is different. For example, for the initial access, the Msg3 transmits an RRC (Radio Resource Control) connection establishment request.

Msg4: contention resolution message, where the UE can determine whether the random access succeeds according to the Msg4. For the UE that initially accesses, the temporary C-RNTI (Cell Radio Network Temporary Identifier) is automatically converted into the unique UE identity (C-RNTI) of the UE in the cell after the contention resolution succeeds.

The contention free random access procedure is mainly divided into three steps.

Msg0: the base station allocates a dedicated preamble for the contention free random access as well as the PRACH resource used by the random access to a UE.

Msg1: the UE sends the specified dedicated preamble to the base station on the specified PRACH resource according to the instruction of the Msg0. After receiving the Msg1, the base station calculates the uplink TA (Timing Advance) according to the Msg1.

Msg2: the base station sends a random access response to the UE.

Under the current mechanism, no operational maintenance is performed on the BWP inactivity timer in the random access procedure. Thus, if the BWP inactivity timer expires in the random access procedure, the BWP changes to the default BWP, the data cannot be transmitted on the most appropriate BWP, the ongoing data transmission may even be interrupted and the ongoing random access procedure may also be affected.

SUMMARY

The invention provides a method for bandwidth part maintenance, so as to solve the problem in the prior art that if the BWP inactivity timer expires in the random access procedure, the BWP changes to the default BWP, the data cannot be transmitted on the most appropriate BWP, the ongoing data transmission may even be interrupted and the ongoing random access procedure may also be affected.

In a first aspect, an embodiment of the invention provides a method for band width part maintenance. The method includes:

keeping, by a user equipment, a current active BWP unchanged during a random access procedure;
restarting, by the user equipment, a BWP inactivity timer after the random access procedure is completed successfully.

In a second aspect, an embodiment of the invention provides a method for maintaining band width part. The method includes:

determining, by a network-side device, a user equipment performing a random access procedure, and determining a BWP on which the random access procedure is performed as an active BWP of the user equipment;
restarting, by the network-side device, a BWP inactivity timer of the user equipment after the random access procedure is completed successfully.

In a third aspect, an embodiment of the invention provides a user equipment for maintaining band width part. The user equipment includes: a processor, a memory and a transceiver, wherein the processor is responsible for managing a bus architecture and general processing, the memory stores data used by the processor when performing operations, and the transceiver is configured to receive and send data under the control of the processor;

the processor is configured to read a program in the memory and perform the process of:

keeping a current active BWP unchanged during a random access procedure; and restarting a BWP inactivity timer after the random access procedure is completed successfully.

In a fourth aspect, an embodiment of the invention provides a network-side device for maintaining band width part. The network-side device includes: a processor, a memory and a transceiver, wherein the processor is responsible for managing a bus architecture and general processing, the memory stores data used by the processor when performing operations, and the transceiver is configured to receive and send data under the control of the processor;

the processor is configured to read a program in the memory and perform the process of:

determining a user equipment performing a random access procedure, determining a BWP on which the random access procedure is performed as an active BWP of the user equipment, and restarting a BWP inactivity timer of the user equipment after the random access procedure is completed successfully.

In a fifth aspect, an embodiment of the invention provides a computer storage medium. The computer storage medium stores a computer program thereon, where the program, when executed by a processor, implements the solution for maintaining band width part on the user equipment side or the solution for maintaining band width part of the network-side device described above.

In a sixth aspect, an embodiment of the invention provides an apparatus for maintaining band width part. The apparatus includes:

a module for keeping a current active BWP of a user equipment unchanged during a random access procedure;

a module for restarting a BWP inactivity timer after the random access procedure is completed successfully.

In a seventh aspect, an embodiment of the invention provides an apparatus for maintaining band width part. The apparatus includes:

a module for determining a user equipment performing a random access procedure and determining a BWP on which the random access procedure is performed as an active BWP of the user equipment;

a module for restarting a BWP inactivity timer of the user equipment after the random access procedure is completed successfully.

In the technical solution according to the embodiments of the invention, the user equipment keeps the current active BWP unchanged during the random access procedure; and restarts the BWP inactivity timer after the random access procedure is completed successfully. Since the user equipment keeps the current active BWP unchanged during the random access procedure and restarts the BWP inactivity timer after the random access procedure is completed successfully, the BWP would not change to the default BWP during the random access procedure, which reduces the situation where the ongoing data transmission is interrupted and decreases the effect on the ongoing random access procedure.

Further, since the correct maintenance of the BWP inactivity timer is guaranteed by restarting the BWP inactivity timer after the random access procedure is completed successfully, the function of the BWP inactivity timer, such as the function of changing to the default BWP after the BWP inactivity timer expires so that the user equipment saves power, can come into play.

BRIEF DESCRIPTION OF THE DRAWINGS

In order to illustrate the technical solutions in the embodiments of the invention more clearly, the accompanying figures which need to be used in describing the embodiments will be introduced below briefly. Obviously the accompanying figures described below are only some embodiments of the invention, and other accompanying figures can also be obtained by those ordinary skilled in the art according to these accompanying figures without creative labor.

DETAILED DESCRIPTION

In the following, some terms in the embodiments of the present application are explained so as to facilitate the understanding of those skilled in the art.

(1) In the embodiments of the present application, the nouns "network" and "system" are often used alternately, but those skilled in the art may understand the meaning thereof.

(2) The term "a plurality of" in the embodiments of the present application refers to two or more, and other quantifiers are similar thereto.

(3) The expression "and/or" describes the association relationship of the associated objects, and indicates that there may be three relationships, for example, A and/or B may represent: only A, both A and B, and only B. The character "/" generally indicates that the associated objects have a kind of "or" relationship.

In order to make the objects, technical solutions and advantages of the invention clearer, the invention will be further illustrated below in details with reference to the accompanying drawings. Obviously the described embodiments are a part of the embodiments of the invention but not all the embodiments. Based upon the embodiments of the invention, all of other embodiments obtained by those ordinary skilled in the art without creative work pertain to the protection scope of the invention.

Figure 1:
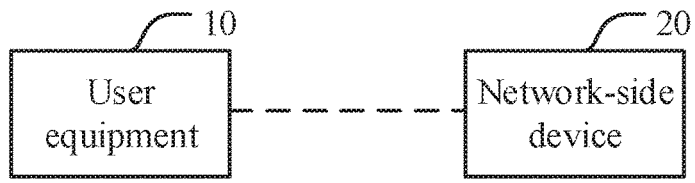
FIG. 1 is a schematic structural diagram of a system for maintaining bandwidth according to an embodiment of the invention.

As shown in FIG. 1, a system for maintaining bandwidth according to an embodiment of the invention includes the followings.

A user equipment 10 is configured to keep the current active BWP unchanged during a random access procedure; and restart a BWP inactivity timer after the random access procedure is completed successfully.

The current active BWP refers to the BWP that initiates the random access procedure. If the active BWP before the user equipment initiates the random access has random access resources, the BWP is the active BWP before the user equipment initiates the random access.

A network-side device 20 is configured to determine a user equipment performing a random access procedure, determine the BWP on which the random access procedure is performed as the active BWP of the user equipment, and restart a BWP inactivity timer of the user equipment after the random access procedure is completed successfully.

In the embodiments of the invention, the user equipment keeps the current active BWP unchanged during the random access procedure; and restarts the BWP inactivity timer after the random access procedure is completed successfully. Since the user equipment keeps the current active BWP unchanged during the random access procedure and restarts the BWP inactivity timer after the random access procedure is completed successfully, thus the BWP would not change to the default BWP during the random access procedure, which reduces the situation where the ongoing data transmission is interrupted and decreases the effect on the ongoing random access procedure.

At the same time, if the BWP inactivity timer cannot be maintained correctly, the function of the BWP inactivity timer will not work properly. For example, if there is a deviation in the maintenance of the BWP inactivity timer due to the unsynchronized understanding of the base station and the user equipment for the time during the random access procedure, the user equipment cannot correctly change to the default BWP or the initial BWP, and thus the purpose of saving power for the user equipment cannot be achieved. Therefore, in the embodiments of the invention, the correct maintenance of the BWP inactivity timer is guaranteed by restarting the BWP inactivity timer after the random access procedure is completed successfully, so that the function of the BWP inactivity timer, such as the function of changing to the default BWP after the BWP inactivity timer expires so that the user equipment saves power, can come into play.

The random access procedures in the embodiments of the invention involve the contention based random access procedure and contention free random access procedure, which are illustrated below respectively.

I. Contention Based Random Access

1. The user equipment restarts BWP inactivity timer at the time when the contention resolution is completed.

Correspondingly, the network-side device restarts the BWP inactivity timer at the time when the contention resolution of the user equipment is completed.

The restarting of the BWP inactivity timer by the user equipment and the network-side device is to set the value of the BWP inactivity timer as the initial value; or the user equipment and the network-side device set the value of the BWP inactivity timer as the value of the BWP inactivity timer before the random access is initiated.

2. The user equipment restarts the BWP inactivity timer at the time when receiving the PDCCH (Physical Downlink Control Channel) that schedules Msg4.

Correspondingly, the network-side device restarts the BWP inactivity timer at the time when sending the PDCCH that schedules Msg4.

The restarting of the BWP inactivity timer by the user equipment and the network-side device is to set the value of the BWP inactivity timer as the initial value; or the user equipment and the network-side device set the value of the BWP inactivity timer as the value of the BWP inactivity timer before the random access is initiated.

II. Contention Free Random Access

The contention free random access procedure includes beam failure recovery (transmission failure recovery) and non-beam failure recovery.

First mode: contention free random access procedure except beam failure recovery.

1 The user equipment restarts the BWP inactivity timer at the time when the contention resolution is completed.

Correspondingly, the network-side device restarts the BWP inactivity timer at the time when the contention resolution of the user equipment is completed.

Restarting of the BWP inactivity timer by the user equipment is to set the value of the BWP inactivity timer as the initial value; or set the value of the BWP inactivity timer as the value of the BWP inactivity timer before the random access is initiated.

2. The user equipment restarts the BWP inactivity timer at the time when sending the PDCCH that schedules Msg2.

Correspondingly, the network-side device restarts the BWP inactivity timer at the time when receiving the PDCCH that schedules Msg2.

The restarting of the BWP inactivity timer by the user equipment and the network-side device is to set the value of the BWP inactivity timer as the initial value; or the user equipment and the network-side device set the value of the BWP inactivity timer as the value of the BWP inactivity timer before the random access is initiated.

Second mode: contention free random access procedure of beam failure recovery.

The user equipment restarts the BWP inactivity timer at the time when receiving the PDCCH order carrying the C-RNTI of the user equipment.

Correspondingly, the network-side device restarts the BWP inactivity timer at the time when sending the PDCCH carrying the C-RNTI of the user equipment.

The restarting of the BWP inactivity timer by the user equipment and the network-side device is to set the value of the BWP inactivity timer as the initial value; or the user equipment and the network-side device set the value of the BWP inactivity timer as the value of the BWP inactivity timer before the random access is initiated.

The network-side device in the embodiments of the invention may be a base station (such as a macro eNB, an evolved NB, a home eNB, etc.), or a RN (Relay Node) device, or other network-side devices.

First embodiment: contention based random access, where the value of the BWP timer is restarted to the initial value, and the starting point of the BWP timer is the time when the contention resolution is completed.

User equipment side: after the random access succeeds, the user equipment determines that the BWP on which the random access is performed is the active BWP, restarts the BWP timer, and sets the restarted BWP timer to the initial value.

The basis on which the user equipment side judges that the contention resolution succeeds is the reception of the Msg4 that can successfully complete the contention resolution.

Base station side: after the random access succeeds, the base station side determines that the BWP on which the user equipment performs the random access is the active BWP, and restarts the BWP timer to the initial value.

Figure 2:
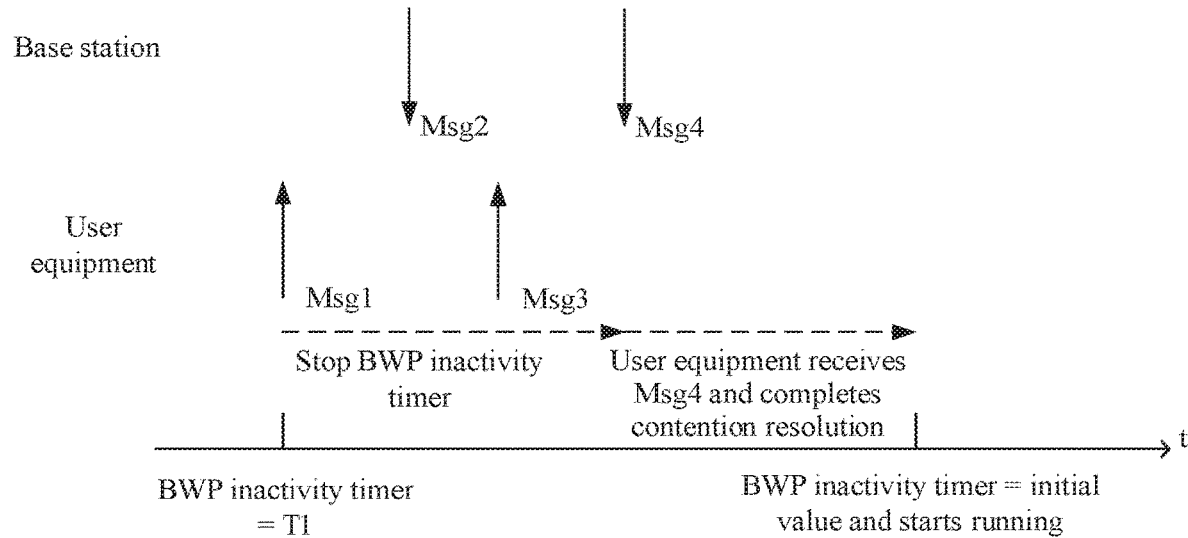
FIG. 2 is a schematic diagram of the bandwidth maintenance under the first contention based random access according to an embodiment of the invention.

The specific process is as shown in FIG. 2.

Second embodiment: contention based random access, where the value of the BWP timer is restarted to the value of the BWP timer before the random access is initiated, and the starting point of the BWP timer is the time when the contention resolution is completed.

User equipment side: after the random access succeeds, the user equipment determines that the BWP on which the random access is performed is the active BWP, restarts the BWP timer, and sets it to the value of the BWP timer before the random access is initiated.

The basis on which the user equipment side judges that the contention resolution succeeds is the reception of the Msg4 that can successfully complete the contention resolution.

Base station side: after the random access succeeds, the base station side determines that the BWP on which the user equipment performs the random access is the active BWP, estimates the time required for the user equipment to complete the random access procedure, restarts the BWP timer, and sets it to the estimated value of the BWP timer before the user equipment initiates the random access.

Figure 3:
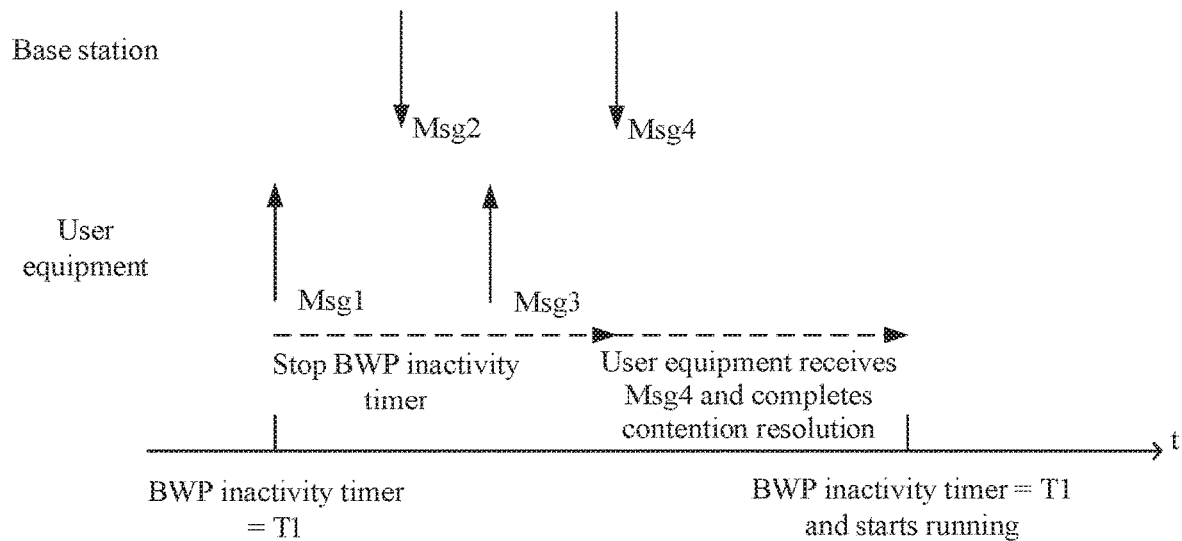
FIG. 3 is a schematic diagram of the bandwidth maintenance under the second contention based random access according to an embodiment of the invention.

The specific process is as shown in FIG. 3.

Third embodiment: contention based random access, where the value of the BWP timer is restarted to the initial value, and the starting point of the BWP timer is the time when the PDCCH that schedules Msg4 is received.

User equipment side: after the random access succeeds, the user equipment determines that the BWP on which the random access is performed is the active BWP, restarts the BWP timer, determines the time point of receiving the Msg4 scheduling command as the starting point of the BWP timer, and sets the BWP timer to the initial value.

Base station side: after the random access succeeds, the base station side determines that the BWP on which the user equipment performs the random access is the active BWP, restarts the BWP timer, determines the time point of sending PDCCH that schedules the Msg4 as the starting point of the BWP timer, and sets the BWP timer to the initial value.

Figure 4:
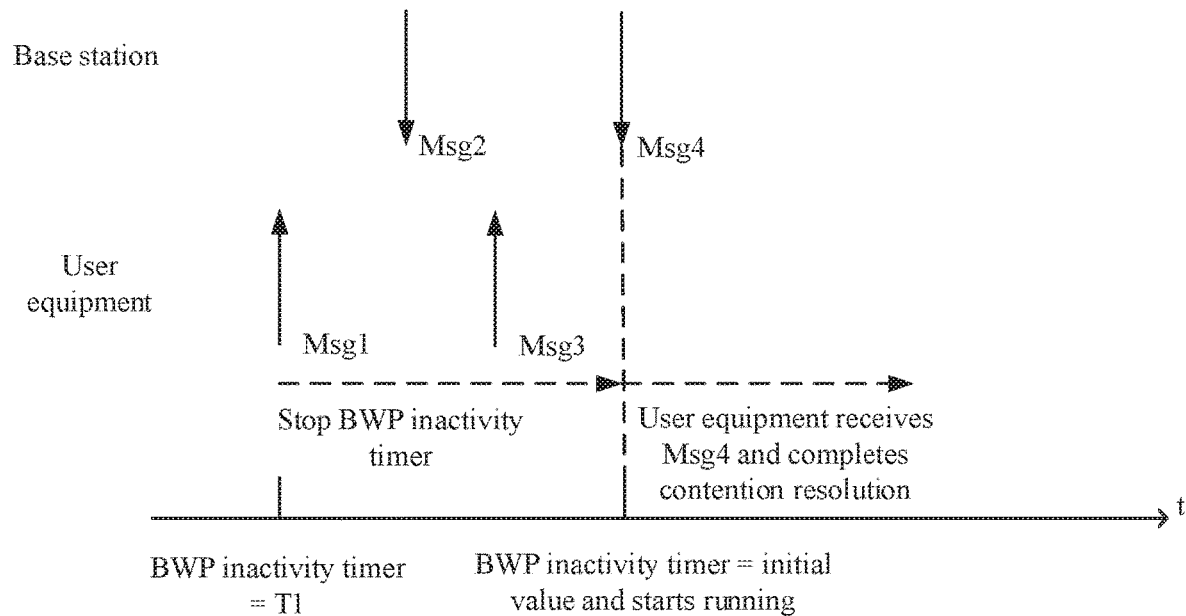
FIG. 4 is a schematic diagram of the bandwidth maintenance under the third contention based random access according to an embodiment of the invention.

The specific process is as shown in FIG. 4.

Fourth embodiment: contention free random access (except beam failure recovery), where the value of the BWP timer is restarted to the initial value, and the starting point of the BWP timer is the time when the contention resolution is completed.

User equipment side: the user equipment initiates a contention free random access after receiving the signaling for triggering the contention free random access (PDCCH order or RRC message) sent by the base station side, determines that the BWP on which the random access is performed is the active BWP after the random access succeeds, and restarts the BWP timer to the initial value, where the basis on which the user equipment side judges that the contention resolution succeeds is that the parsed RAPID in the Msg2 MAC RAR is the same as the preamble ID of the Msg1 sent by the user equipment. The time when the user equipment side stops the BWP timer may be the time when the signaling for triggering the contention free random access (PDCCH order or RRC message) sent by the base station side is received, or the time when the user equipment side starts initiating the contention free random access, i.e., the time when the Msg1 is sent. The time when the user equipment sends the Msg1 is determined as the time when the BWP timer is stopped in the following figure.

Base station side: the base station side sends the signaling for triggering the contention free random access to the user equipment, stops the BWP timer, determines that the BWP on which the user equipment performs the random access is the active BWP after the random access succeeds, and restarts the BWP timer to the initial value. The time when the base station side stops the BWP timer may be the time when the signaling for triggering the contention free random access (PDCCH order or RRC message) is sent to the user equipment, or the time when the user equipment side starts initiating the contention free random access, i.e., the time when the Msg1 is sent.

Figure 5:
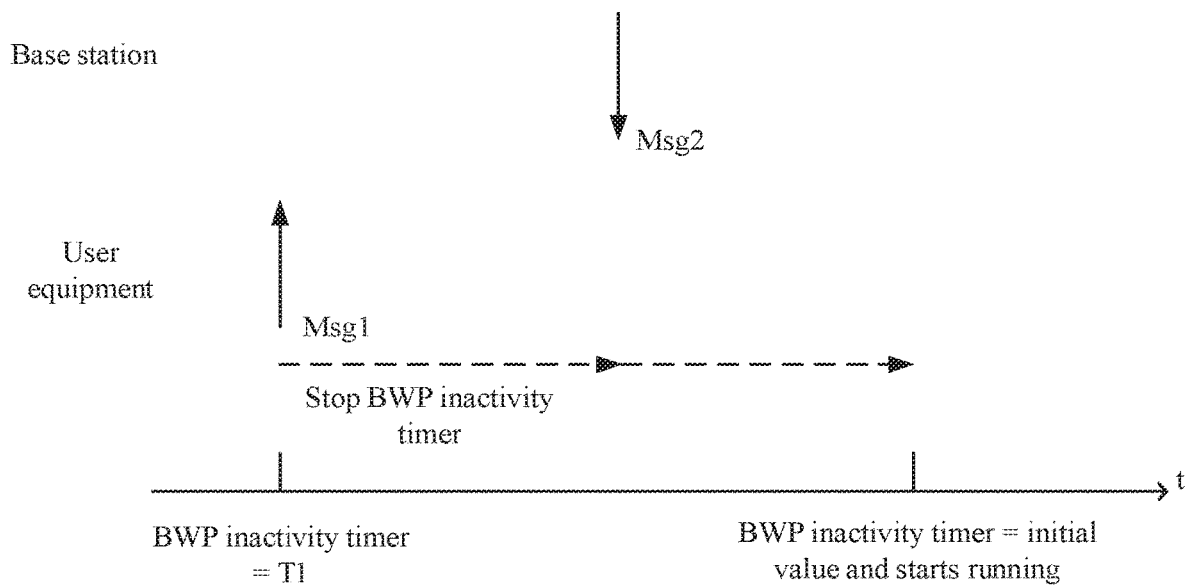
FIG. 5 is a schematic diagram of the bandwidth maintenance under the first contention free random access according to an embodiment of the invention.

The time when the user equipment sends the Msg1 is determined as the time when the BWP timer is stopped, and the specific process is as shown in FIG. 5.

Fifth embodiment: contention free random access (except beam failure recovery), where the value of the BWP timer is restarted to the value of the BWP timer before the random access is initiated, and the starting point of the BWP timer is the time when the contention resolution is completed.

User equipment side: the user equipment initiates a contention free random access after receiving the signaling for triggering the contention free random access (PDCCH order or RRC message) sent by the base station side, determines that the BWP on which the random access is performed is the active BWP after the random access succeeds, and restarts the BWP timer to the value of the BWP timer at the time when the BWP timer is stopped. The basis on which the user equipment side judges that the contention resolution succeeds is that the parsed RAPID in the Msg2 MAC RAR is the same as the preamble ID of the Msg1 sent by the user equipment. The time when the user equipment side stops the BWP timer may be the time when the signaling for triggering the contention free random access (PDCCH order or RRC message) sent by the base station side is received, or the time when the user equipment side starts initiating the contention free random access, i.e., the time when the Msg1 is sent. The time when the user equipment sends the Msg1 is determined as the time when the BWP timer is stopped in the following figure.

Base station side: the base station side sends the signaling for triggering the contention free random access to the user equipment, stops the BWP timer, determines that the BWP on which the user equipment performs the random access is the active BWP after the random access succeeds, and restarts the BWP timer to the value of the BWP timer at the time when the BWP timer is stopped. The time when the base station side stops the BWP timer may be the time when the signaling for triggering the contention free random access (PDCCH order or RRC message) is sent to the user equipment, or the time when the user equipment side starts initiating the contention free random access, i.e., the time when the Msg1 is sent. The time when the user equipment sends the Msg1 is determined as the time when the BWP timer is stopped in the following figure.

Figure 6:
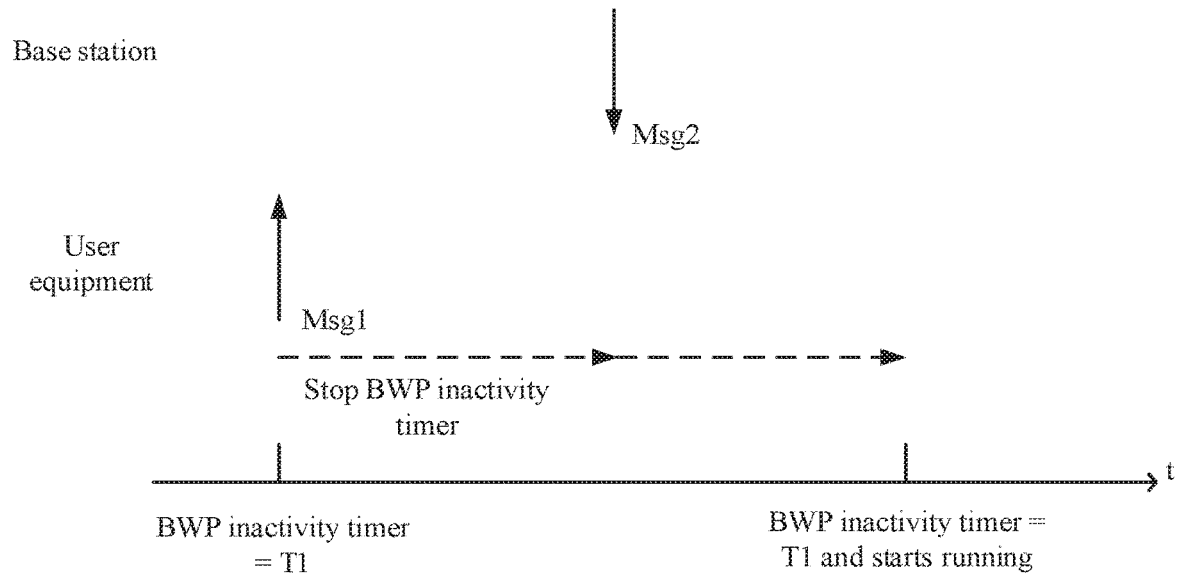
FIG. 6 is a schematic diagram of the bandwidth maintenance under the second contention free random access according to an embodiment of the invention.

The specific process is as shown in FIG. 6.

Sixth embodiment: contention free random access (except beam failure recovery), where the value of the BWP timer is restarted to the initial value, and the starting point of the BWP timer is the time when the PDCCH order that schedules Msg2 is received.

User equipment side: the user equipment initiates a contention free random access after receiving the signaling for triggering the contention free random access (PDCCH order or RRC message) sent by the base station side, determines that the BWP on which the random access is performed is the active BWP after the random access succeeds, and restarts the BWP timer to the initial value, where the starting point of the BWP timer is the time when the PDCCH order that schedules Msg2 is received. The time when the user equipment side stops the BWP timer may be the time when the signaling for triggering the contention free random access (PDCCH order or RRC message) sent by the base station side is received, or the time when the user equipment side starts initiating the contention free random access, i.e., the time when the Msg1 is sent. The time when the user equipment sends the Msg1 is determined as the time when the BWP timer is stopped in the following figure.

Base station side: the base station side sends the signaling for triggering the contention free random access to the user equipment, stops the BWP timer, determines that the BWP on which the user equipment performs the random access is the active BWP after the random access succeeds, and restarts the BWP timer to the initial value, where the starting point of the BWP timer is the time when the PDCCH order that schedules the Msg2 is sent. The time when the base station side stops the BWP timer may be the time when the signaling for triggering the contention free random access (PDCCH order or RRC message) is sent to the user equipment, or the time when the user equipment side starts initiating the contention free random access, i.e., the time when the Msg1 is sent.

Figure 7:
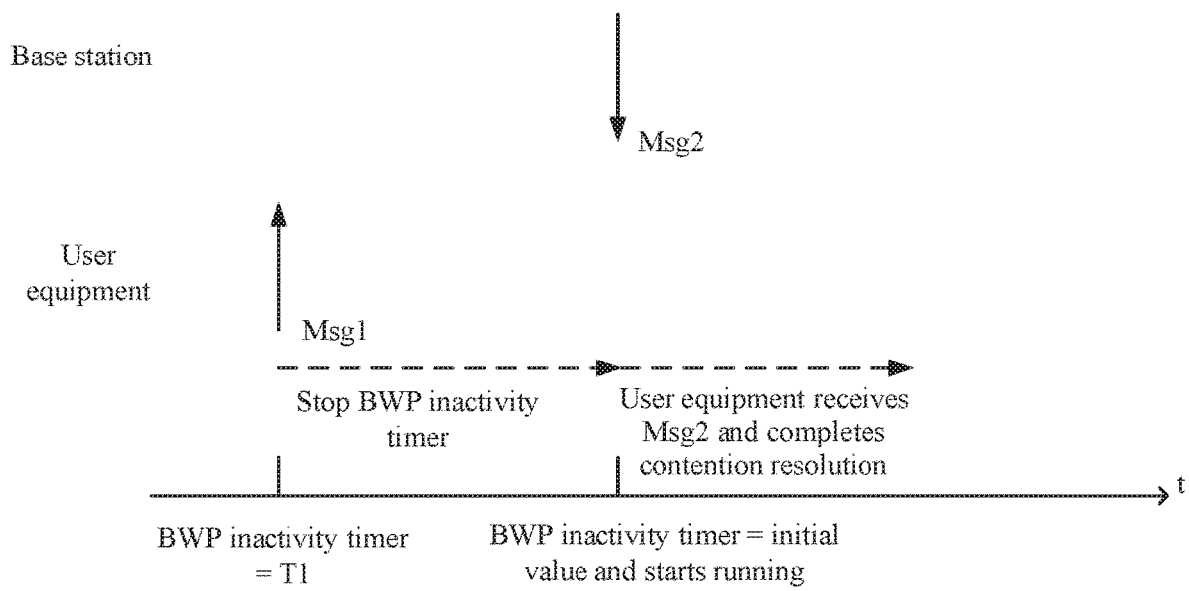
FIG. 7 is a schematic diagram of the bandwidth maintenance under the third contention free random access according to an embodiment of the invention.

The time when the user equipment sends the Msg1 is determined as the time when the BWP timer is stopped, and the specific process is as shown in FIG. 7.

Seventh embodiment: contention free random access (beam failure recovery), where the value of the BWP timer is restarted to the initial value when the contention resolution is completed.

User equipment side: the user equipment initiates a contention free random access procedure for beam failure recovery, stops the BWP timer, determines that the BWP on which the random access is performed is the active BWP after the random access succeeds, and restarts the BWP timer to the initial value, where the starting point of the BWP timer is the time when the PDCCH scheduling command carrying the C-RNTI of the user equipment is received.

Base station side: the base station side receives the contention free random access procedure for beam failure recovery initiated by the user equipment, stops the BWP timer, determines that the BWP on which the random access is performed is the active BWP after the random access succeeds, and restarts the BWP timer to the initial value, where the starting point of the BWP timer is the time when the PDCCH scheduling command with the C-RNTI of the user equipment is sent.

Figure 8:
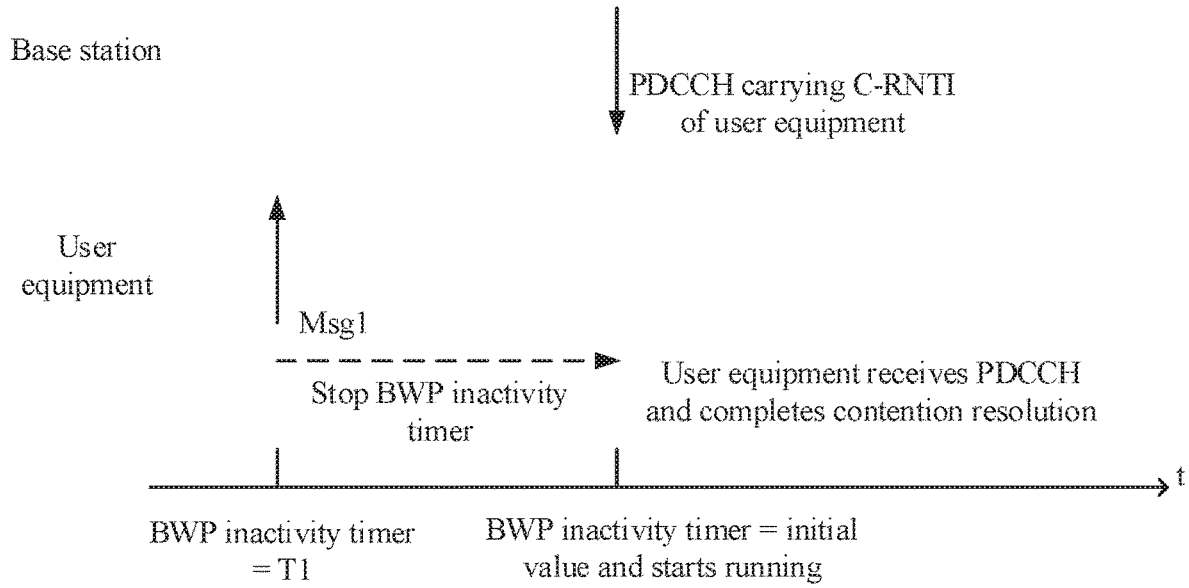
FIG. 8 is a schematic diagram of the bandwidth maintenance under the fourth contention free random access according to an embodiment of the invention.

The specific process is as shown in FIG. 8.

Figure 9:
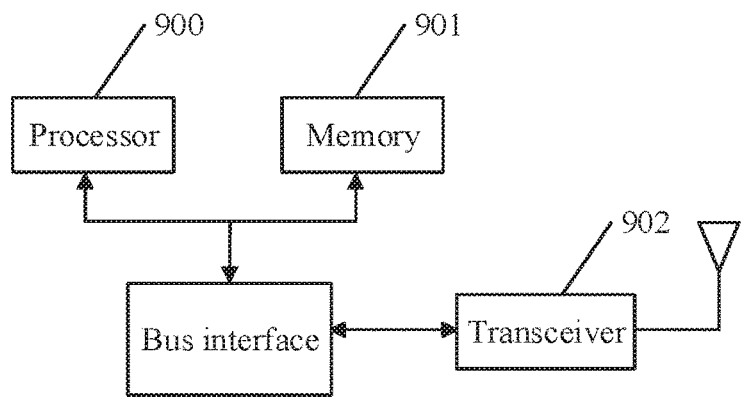
FIG. 9 is a schematic structural diagram of a first user equipment according to an embodiment of the invention.

As shown in FIG. 9, a first user equipment of an embodiment of the invention includes: a processor 900, a memory 901 and a transceiver 902.

The processor 900 is responsible for managing the bus architecture and general processing, and the memory 901 may store the data used by the processor 900 when performing the operations. The transceiver 902 is configured to receive and send the data under the control of the processor 900.

The bus architecture may include any numbers of interconnected buses and bridges, and specifically link various circuits of one or more processors represented by the processor 900 and the memory represented by the memory 901. The bus architecture may further link various other circuits such as peripheral device, voltage regulator and power management circuit, which are all well known in the art and thus will not be further described again herein. The bus interface provides an interface. The processor 900 is responsible for managing the bus architecture and general processing, and the memory 901 may store the data used by the processor 900 when performing the operations.

The procedure disclosed by the embodiment of the invention may be applied in the processor 900 or implemented by the processor 900. In the implementation process, each step of the signal processing flow may be completed by the integrated logic circuit of hardware or the instruction in the form of software in the processor 900. The processor 900 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the invention. The general-purpose processor may be a microprocessor or any conventional processor or the like. The steps of the method disclosed in combination with the embodiments of the invention may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 901, and the processor 900 reads the information in the memory 901 and completes the steps of the signal processing flow in combination with its hardwares.

The processor 900 is configured to read a program in the memory 901 and perform the process of:
  keeping the current active BWP unchanged during a random access procedure; and restarting a BWP inactivity timer after the random access procedure is completed successfully.

Optionally, the random access procedure is a contention based random access procedure;
  the processor 900 is configured to:
  restart the BWP inactivity timer at the time when completing the contention resolution or when receiving the PDCCH that schedules Msg4.

Optionally, the random access procedure is a contention free random access procedure except beam failure recovery;
  the processor 900 is configured to:
  restart the BWP inactivity timer at the time when completing the contention resolution or when receiving the PDCCH that schedules Msg2.

Optionally, the random access procedure is a contention free random access procedure of beam failure recovery;

the processor 900 is configured to:
restart the BWP inactivity timer at the time when receiving the PDCCH order carrying the C-RNTI of the user equipment.

Optionally, the processor 900 is configured to:
set the value of the BWP inactivity timer as the initial value; or
set the value of the BWP inactivity timer as the value of the BWP inactivity timer before the random access is initiated.

Figure 10:
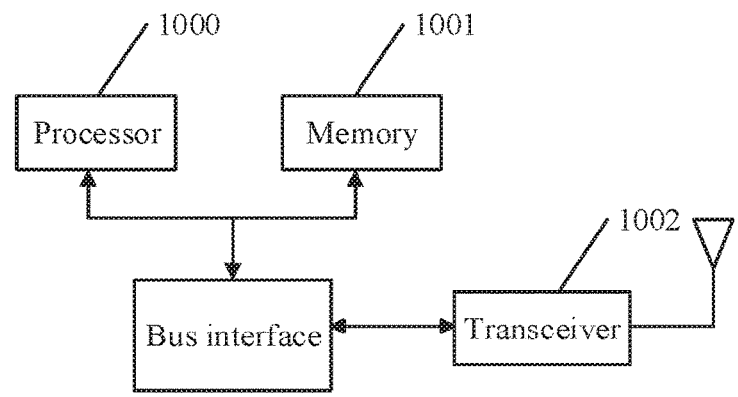
FIG. 10 is a schematic structural diagram of a first network-side device according to an embodiment of the invention.

As shown in FIG. 10, a first network-side device of an embodiment of the invention includes: a processor 1000, a memory 1001 and a transceiver 1002.

The processor 1000 is responsible for managing the bus architecture and general processing, and the memory 1001 may store the data used by the processor 1000 when performing the operations. The transceiver 1002 is configured to receive and send the data under the control of the processor 1000.

The bus architecture may include any numbers of interconnected buses and bridges, and specifically link various circuits of one or more processors represented by the processor 1000 and the memory represented by the memory 1001. The bus architecture may further link various other circuits such as peripheral device, voltage regulator and power management circuit, which are all well known in the art and thus will not be further described again herein. The bus interface provides an interface. The processor 1000 is responsible for managing the bus architecture and general processing, and the memory 1001 may store the data used by the processor 1000 when performing the operations.

The procedure disclosed by the embodiment of the invention may be applied in the processor 1000 or implemented by the processor 1000. In the implementation process, each step of the signal processing flow may be completed by the integrated logic circuit of hardware in the processor 1000 or the instruction in the form of software. The processor 1000 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the invention. The general-purpose processor may be a microprocessor or any conventional processor or the like. The steps of the method disclosed in combination with the embodiments of the invention may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1001, and the processor 1000 reads the information in the memory 1001 and completes the steps of the signal processing flow in combination with its hardware.

Here, the processor 1000 is configured to read a program in the memory 1001 and perform the process of:
determining a user equipment performing a random access procedure, determining the BWP on which the random access is performed as the active BWP of the user equipment, and restarting a BWP inactivity timer of the user equipment after the random access procedure is completed successfully.

Optionally, the random access procedure is a contention based random access procedure;
the processor 1000 is configured to:
restart the BWP inactivity timer at the time when the contention resolution of the user equipment is completed or when sending the PDCCH that schedules Msg4.

Optionally, the random access procedure is a contention free random access procedure except beam failure recovery;
the processor 1000 is configured to:
restart the BWP inactivity timer at the time when the contention resolution of the user equipment is completed or when sending the PDCCH that schedules Msg2.

Optionally, the random access procedure is a contention free random access procedure of beam failure recovery;
the processor 1000 is configured to:
restart the BWP inactivity timer at the time when sending the PDCCH which carries the C-RNTI of the user equipment.

Optionally, the processor 1000 is configured to:
set the value of the BWP inactivity timer as the initial value; or
set the value of the BWP inactivity timer as the value of the BWP inactivity timer before the user equipment initiates the random access.

Figure 11:
FIG. 11 is a schematic structural diagram of a second user equipment according to an embodiment of the invention.

As shown in FIG. 11, a second user equipment of an embodiment of the invention includes:
a processing module 1100 configured to keep the current active BWP unchanged during a random access procedure;
a first restart operation module 1101 configured to restart a BWP inactivity timer after the random access procedure is completed successfully.

Optionally, the random access procedure is a contention based random access procedure;
the first restart operation module 1101 is configured to:
restart the BWP inactivity timer at the time when completing the contention resolution or when receiving the PDCCH that schedules Msg4.

Optionally, the random access procedure is a contention free random access procedure except beam failure recovery;
the first restart operation module 1101 is configured to:
restart the BWP inactivity timer at the time when completing the contention resolution or when receiving the PDCCH that schedules Msg2.

Optionally, the random access procedure is a contention free random access procedure of beam failure recovery;
the first restart operation module 1101 is configured to:
restart the BWP inactivity timer at the time when receiving the PDCCH order which carries the C-RNTI of the user equipment.

Optionally, the first restart operation module 1101 is configured to:
set the value of the BWP inactivity timer as the initial value; or
set the value of the BWP inactivity timer as the value of the BWP inactivity timer before the random access is initiated.

Figure 12:
FIG. 12 is a schematic structural diagram of a second network-side device according to an embodiment of the invention.

As shown in FIG. 12, a second network-side device of an embodiment of the invention includes:
a determining module 1200 configured to determine a user equipment performing a random access procedure, and determine the BWP on which the random access is performed as the active BWP of the user equipment;

a second restart operation module 1201 configured to restart a BWP inactivity timer of the user equipment after the random access procedure is completed successfully.

Optionally, the random access procedure is a contention based random access procedure;

the second restart operation module 1201 is configured to:
restart the BWP inactivity timer at the time when the contention resolution of the user equipment is completed or when sending the PDCCH that schedules Msg4.

Optionally, the random access procedure is a contention based random access procedure except beam failure recovery;

the second restart operation module 1201 is configured to:
restart the BWP inactivity timer at the time when the contention resolution of the user equipment is completed or when sending the PDCCH that schedules Msg2.

Optionally, the random access procedure is a contention free random access procedure of beam failure recovery;

the second restart operation module 1201 is configured to:
restart the BWP inactivity timer at the time when sending the PDCCH carrying the C-RNTI of the user equipment.

Optionally, the second restart operation module 1201 is configured to:

set the value of the BWP inactivity timer as the initial value; or set the value of the BWP inactivity timer as the value of the BWP inactivity timer before the user equipment initiates the random access.

An embodiment of the invention provides a readable storage medium that is a non-volatile readable storage medium and includes program codes. When the program codes run on a computing device, the program codes are configured to cause the computing device to perform the actions of the user equipment performing the scheduling request described above.

An embodiment of the invention provides a readable storage medium that is a non-volatile readable storage medium and includes program codes. When the program codes run on a computing device, the program codes are configured to cause the computing device to perform the actions of the network-side device performing the scheduling request described above.

Based upon the same inventive concept, an embodiment of the invention further provides a method for maintaining bandwidth on the user equipment side. Since the principle solving the problem of this method is similar to the device, the implementations of this method can refer to the implementations of the device, and the repeated description thereof will be omitted here.

Figure 13:
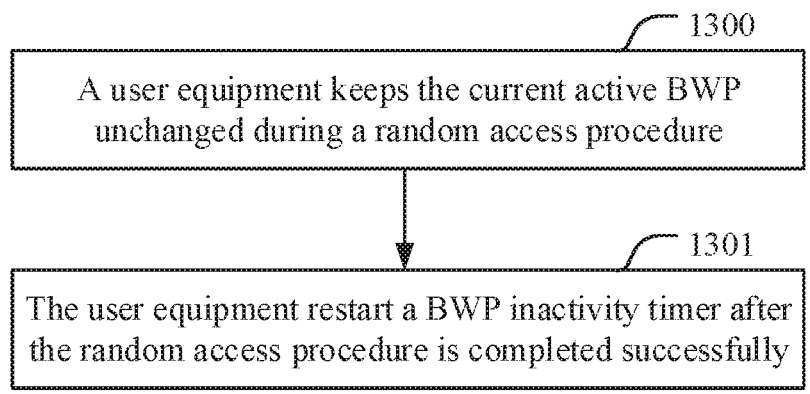
FIG. 13 is a schematic flowchart of a method for maintaining bandwidth by the user equipment side according to an embodiment of the invention.

As shown in FIG. 13, a method for maintaining bandwidth on the user equipment side of an embodiment of the invention includes the following steps.

Step 1300: a user equipment keeps the current active BWP unchanged during a random access procedure.

Step 1301: the user equipment restarts a BWP inactivity timer after the random access procedure is completed successfully.

Optionally, the random access procedure is a contention based random access procedure;

the user equipment restarting the BWP inactivity timer after the random access procedure is completed successfully includes:

the user equipment restarting the BWP inactivity timer at the time when completing the contention resolution or when receiving the PDCCH that schedules Msg4.

Optionally, the random access procedure is a contention free random access procedure except beam failure recovery;

the user equipment restarting the BWP inactivity timer after the random access procedure is completed successfully includes:

the user equipment restarting the BWP inactivity timer at the time when completing the contention resolution or when receiving the PDCCH that schedules Msg2.

Optionally, the random access procedure is a contention free random access procedure of beam failure recovery;

the user equipment restarting the BWP inactivity timer after the random access procedure is completed successfully includes:

the user equipment restarting the BWP inactivity timer at the time when receiving the PDCCH order that carries the C-RNTI of the user equipment.

Optionally, the user equipment restarting the BWP inactivity timer includes:

the user equipment sets the value of the BWP inactivity timer as the initial value; or the user equipment sets the value of the BWP inactivity timer as the value of the BWP inactivity timer before the random access is initiated.

Based upon the same inventive concept, an embodiment of the invention further provides a method for maintaining bandwidth on a network-side device. Since the principle solving the problem is similar to the device, the implementations of this method can refer to the implementations of the device, and the repeated description thereof will be omitted here.

Figure 14:
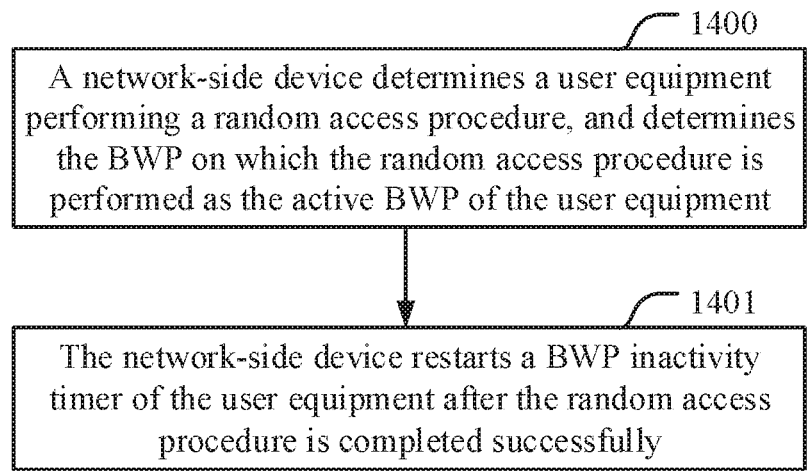
FIG. 14 is a schematic flowchart of a method for maintaining bandwidth by a network-side device according to an embodiment of the invention.

As shown in FIG. 14, a method for bandwidth maintenance by a network-side device of an embodiment of the invention includes the following steps.

Step 1400: a network-side device determines a user equipment performing a random access procedure, and determines the BWP on which the random access is performed as the active BWP of the user equipment.

Step 1401: the network-side device restarts a BWP inactivity timer of the user equipment after the random access procedure is completed successfully.

Optionally, the random access procedure is a contention based random access procedure;

the network-side device restarting the BWP inactivity timer of the user equipment after the random access procedure of the user equipment is completed successfully includes:

the network-side device restarts the BWP inactivity timer at the time when the contention resolution of the user equipment is completed or when sending the PDCCH that schedules Msg4.

Optionally, the random access procedure is a contention free random access procedure except beam failure recovery;

the network-side device restarting the BWP inactivity timer of the user equipment after the random access procedure of the user equipment is completed successfully includes:

the network-side device restarts the BWP inactivity timer at the time when the contention resolution of the user equipment is completed or when sending the PDCCH that schedules Msg2.

Optionally, the random access procedure is a contention free random access procedure of beam failure recovery;

the network-side device restarting the BWP inactivity timer of the user equipment after the random access procedure of the user equipment is completed successfully includes:
the network-side device restarts the BWP inactivity timer at the time when sending the PDCCH that carries the C-RNTI of the user equipment.

Optionally, the network-side device restarting of a BWP inactivity timer of the user equipment includes:
the network-side device sets the value of the BWP inactivity timer as the initial value; or
the network-side device sets the value of the BWP inactivity timer as the value of the BWP inactivity timer before the user equipment initiates the random access.

Based upon the same inventive concept, an embodiment of the invention further provides an apparatus for maintaining bandwidth on a network-side device. Since the principle solving the problem is similar to the device, the implementations of this apparatus can refer to the implementations of the device, and the repeated description thereof will be omitted here.

An apparatus for maintaining band width part according to an embodiment of the invention includes:
a module for keeping the current active BWP of a user equipment unchanged during a random access procedure;
a module for restarting a BWP inactivity timer after the random access procedure is completed successfully.

An apparatus for maintaining band width part according to an embodiment of the invention includes:
a module for determining a user equipment performing a random access procedure and determining the BWP on which the random access is performed as the active BWP of the user equipment;
a module for restarting a BWP inactivity timer of the user equipment after the random access procedure is completed successfully.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A method for maintaining Band Width Part, BWP, comprising:
keeping, by a user equipment, a current active BWP unchanged during a random access procedure;
restarting, by the user equipment, a BWP inactivity timer after the random access procedure is completed successfully;
in a case that the random access procedure is a contention based random access procedure;
the restarting, by the user equipment, the BWP inactivity timer after the random access procedure is completed successfully comprises:
restarting, by the user equipment, the BWP inactivity timer at the time when completing contention resolution or when receiving a Physical Downlink Control Channel, PDCCH, that schedules Msg4;
in a case that the random access procedure is a contention free random access procedure except beam failure recovery;
restarting, by the user equipment, the BWP inactivity timer after the random access procedure is completed successfully comprises:
restarting, by the user equipment, the BWP inactivity timer at the time when completing contention resolution or when receiving a PDCCH that schedules Msg2;
in a case that the random access procedure is a contention free random access procedure of beam failure recovery;
the restarting, by the user equipment, the BWP inactivity timer after the random access procedure is completed successfully comprises:
restarting, by the user equipment, the BWP inactivity timer at the time when receiving a PDCCH order carrying a Cell-Radio Network Temporary Identifier, C-RNTI, of the user equipment.

2. The method of claim 1, wherein restarting, by the user equipment, the BWP inactivity timer comprises:
setting, by the user equipment, a value of the BWP inactivity timer as an initial value; or
setting, by the user equipment, a value of the BWP inactivity timer as a value of the BWP inactivity timer before the random access is initiated.

3. A method for maintaining band width part, comprising:
determining, by a network-side device, a user equipment performing a random access procedure, and determining a BWP on which the random access procedure is performed as an active BWP of the user equipment;
restarting, by the network-side device, a BWP inactivity timer of the user equipment after the random access procedure is completed successfully;
in a case that the random access procedure is a contention based random access procedure;
the restarting, by the network-side device, the BWP inactivity timer of the user equipment after the random access procedure of the user equipment is completed successfully comprises:

restarting, by the network-side device, the BWP inactivity timer at the time when contention resolution of the user equipment is completed or when sending a PDCCH that schedules Msg4;
in a case that the random access procedure is a contention free random access procedure except beam failure recovery;
restarting, by the network-side device, the BWP inactivity timer of the user equipment after the random access procedure of the user equipment is completed successfully comprises:
restarting, by the network-side device, the BWP inactivity timer at the time when contention resolution of the user equipment is completed or when sending a PDCCH that schedules Msg2;
in a case that the random access procedure is a contention free random access procedure of beam failure recovery;
restarting, by the network-side device, the BWP inactivity timer of the user equipment after the random access procedure of the user equipment is completed successfully comprises:
restarting, by the network-side device, the BWP inactivity timer at the time when sending a PDCCH carrying a C-RNTI of the user equipment.

4. The method of claim 3, wherein restarting, by the network-side device, the BWP inactivity timer of the user equipment comprises:
setting, by the network-side device, a value of the BWP inactivity timer as an initial value; or
setting, by the network-side device, a value of the BWP inactivity timer as a value of the BWP inactivity timer before the user equipment initiates the random access.

5. A network-side device for maintaining band width part, comprising: a processor, a memory and a transceiver, wherein the processor is responsible for managing a bus architecture and general processing, the memory stores data used by the processor when performing operations, and the transceiver is configured to receive and send data under the control of the processor;
the processor is configured to read a program in the memory and perform the method according to claim 3.

6. A user equipment for maintaining band width part, comprising: a processor, a memory and a transceiver, wherein the processor is responsible for managing a bus architecture and general processing, the memory stores data used by the processor when performing operations, and the transceiver is configured to receive and send data under the control of the processor;
the processor is configured to read a program in the memory and perform the process of:
keeping a current active BWP unchanged during a random access procedure; and restarting a BWP inactivity timer after the random access procedure is completed successfully;
in a case that the random access procedure is a contention based random access procedure;
the processor is configured to:
restart the BWP inactivity timer at the time when completing contention resolution or when receiving a PDCCH that schedules Msg4;
in a case that the random access procedure is a contention free random access procedure except beam failure recovery;
the processor is configured to:
restart the BWP inactivity timer at the time when completing contention resolution or when receiving a PDCCH that schedules Msg2;
in a case that the random access procedure is a contention free random access procedure of beam failure recovery;
the processor is configured to:
restart the BWP inactivity timer at the time when receiving a PDCCH order carrying a C-RNTI of the user equipment.

7. The user equipment of claim 6, wherein the processor is configured to:
set a value of the BWP inactivity timer as an initial value; or
set a value of the BWP inactivity timer as a value of the BWP inactivity timer before the random access is initiated.

* * * * *